May 10, 1938.  K. T. ASHDOWN ET AL  2,117,130
ELECTRIC SWITCH GEAR
Filed Aug. 28, 1936   2 Sheets-Sheet 1

Inventors:
Kenneth T. Ashdown,
Vernon L. Cox,
by  Harry E. Dunham
Their Attorney.

Patented May 10, 1938

2,117,130

UNITED STATES PATENT OFFICE 2,117,130

ELECTRIC SWITCH GEAR

Kenneth T. Ashdown, Drexel Hill, and Vernon L. Cox, Philadelphia, Pa., assignors to General Electric Company, a corporation of New York Application August 28, 1936, Serial No. 98,430

3 Claims. (Cl. 200—114)

Our invention relates to electric switchgear, more particularly to metal enclosed switchgear wherein the high voltage circuits and associated electrical apparatus, such as circuit breakers, potential transformers, fuses and disconnect devices, are housed within a grounded metal casing.

A principal object of our invention is the provision of improved switchgear of the above type wherein high voltage electrical apparatus, such as fuses, for example, for protecting a potential transformer, is operatively related to a door of the metal housing so as to be disconnected with respect to the associated high voltage circuit and bodily moved towards the door opening when said door is opened for the purpose of inspecting or replacing said apparatus.

Our invention will be more fully set forth in the following description referring to the accompanying drawings, and the features of novelty which characterize our invention will be pointed out with particularity in the claims annexed to and forming a part of this specification.

Figure 1:
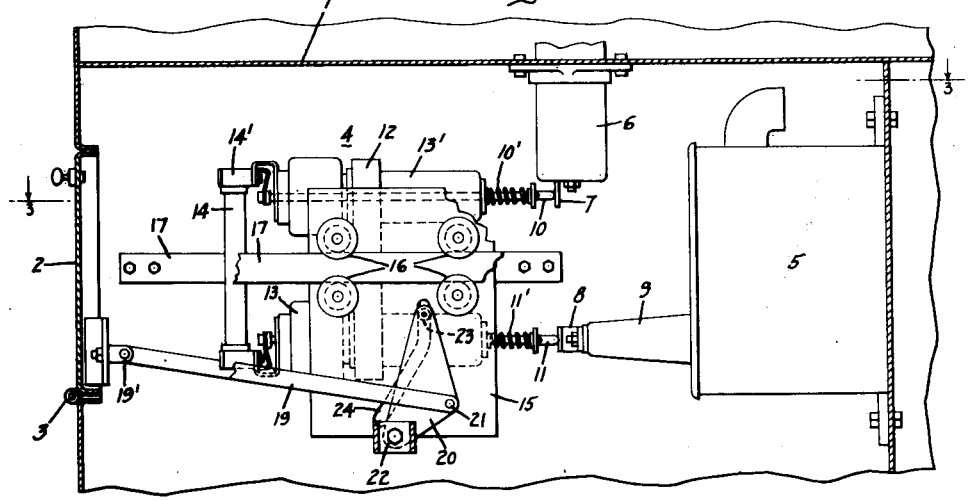
Figure 2:
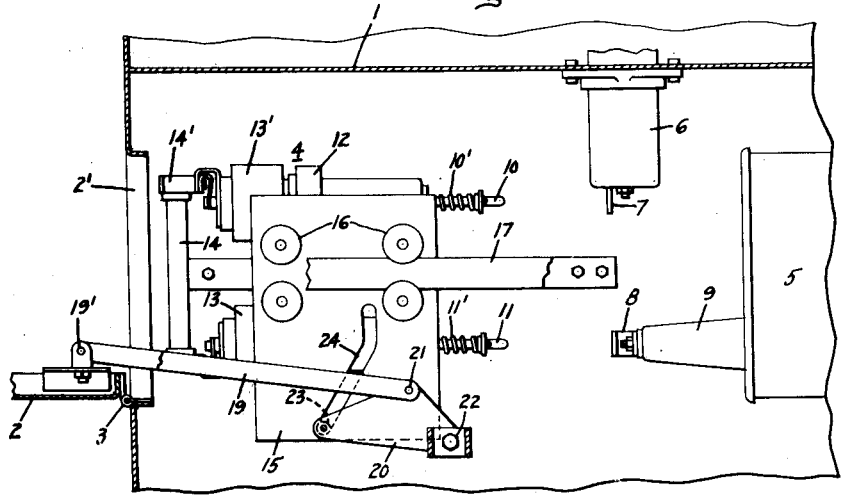
Figure 3:
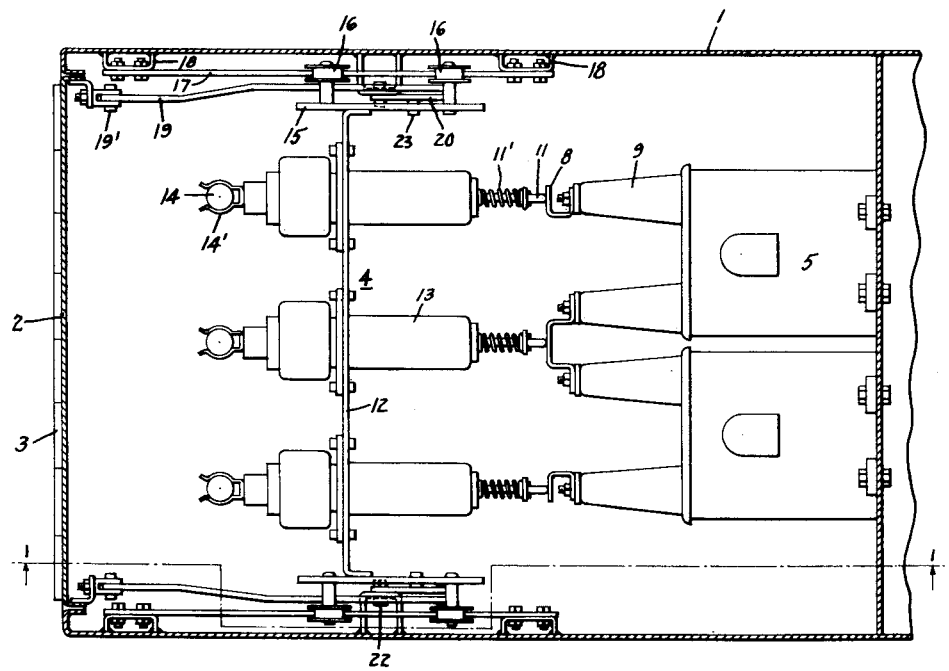

Referring to the drawings, Fig. 1 is an elevational view, partly broken away, of metal enclosed switchgear in the closed circuit position embodying the present invention; Fig. 2 is a similar view showing the switchgear in the disconnected position, and Fig. 3 is a plan view, partly in section, of the switchgear in the closed circuit position as generally indicated by the section lines 3—3 of Fig. 1.

The metal enclosed switchgear illustrated comprises a sheet metal housing 1 having a door 2 hinged at 3 to swing outwardly. The metal housing 1, as in the case of metal enclosed switchgear generally, is grounded so that high voltage apparatus within the housing is electrically isolated when the housing is completely closed with respect to an operative. Accordingly, in this type of switchgear it is customary to open the circuit and disconnect the electrical apparatus from its associated high voltage circuit by means of interlocks when the housing is opened for purposes of inspection or maintenance.

The high voltage circuit in the present instance in the housing 1 includes a fuse panel unit generally indicated at 4 and a potential transformer likewise generally indicated at 5. One terminal of the circuit includes an insulating lead-in bushing 6 mounted in a wall of the housing 1. A stationary disconnect contact 7 forming part of the terminal is secured to the inner end of the bushing 6. The other terminal of the circuit connected to the potential transformer 5 also includes a stationary disconnect contact 8 carried at the end of an insulating bushing 9. Coacting with the stationary disconnect contacts 7 and 8 are the movable disconnect contacts 10 and 11, respectively, of the fuse panel unit 4. Movement of the panel unit 4 towards the left to separate the disconnect contacts disconnects the fuse panel with respect to the terminals of the high voltage circuit above described.

Referring more particularly to the fuse panel unit 4, a three phase arrangement is shown (Fig. 3) wherein a plate-like carrier member 12 flanged at opposite sides and forming a panel section has mounted therein a pair of insulating conductor bushings for each individual phase. The lower phase bushings are indicated at 13 and the corresponding upper bushings at 13' (Fig. 1). The panel 12, which is mounted with respect to the housing 1 in a manner presently described, is disposed parallel to the door 2 in the closed position thereof.

Carried on the side of the panel adjacent said door are the phase fuses 14 which are suitably connected to terminal clips 14' at the ends of the corresponding bushings. At the opposite side of the panel the movable disconnect contacts 10 and 11 are carried at the corresponding terminals of the bushings 13' and 13. As shown, the movable disconnect contacts 10 and 11 are of the sliding pin type and are resiliently biased, as by springs 10' and 11', into contact with the coacting contacts 7 and 8 respectively.

The guiding and supporting means for the fuse panel section 12 comprises laterally disposed supporting plates 15 suitably secured, as by welding, to the opposite side flanges of the panel 12. Each supporting plate 15 is provided with four roller bearings 16 which engage the upper and lower sides of a fixed guide rail 17 as illustrated. The guide rail 17 is suitably secured, as at 18, to a side wall of the housing 1. Accordingly, the fuse panel unit 4 is slidably mounted on the guide rails 17 for horizontal reciprocal movement with respect to the stationary disconnect contacts 8.

For the purpose of automatically disconnecting the fuse panel unit and for bringing the fuses 14 into the doorway to an unobstructed position when the door 2 is opened by an operative, means are provided interconnecting said door and fuse panel unit arranged so that initial opening of the door causes a comparatively large movement of the fuse unit towards the disconnected position and complete opening causes movement of the fuses 14 substantially into the doorway so that the operative does not have to reach into the housing to any appreciable extent in order to replace the fuses.

To this end, a linkage is provided interconnecting the door 2 and each of the panel supporting plates 15 comprising a link 19 connected to the door 2 at 19' near the hinge thereof, and a lever 20 connected to the link 19 at 21 and pivotally mounted at 22 on a side wall of the main housing. The lever 20 is provided with a roller 23 operable within an elongated slot 24 which is formed in the supporting plate 15, the arrangement being such that counterclockwise rotation of the lever 20 in response to opening of the door 2 causes camming of the plate 15 towards the left and consequent disconnection of the fuse unit.

As shown, the slot 24 is shaped so that during the initial door opening movement, the unit 4 will travel an appreciable distance towards its disconnected position, the remainder of the movement being graded as desired. It is, therefore, impossible for an operative to come in contact with a live portion of the high voltage circuit even in the event that the door 2 is open but a slight distance.

In the completely disconnected position shown by Fig. 2, the fuses 14 are moved practically into the doorway at 2' so that they may be readily inspected in an unobstructed position for inspection or replacement. That is, the fuses are for practical purposes substantially flush with the front of the housing so that it is not necessary for the operative to undertake any risk whatever by reaching into the housing for the fuses. It will be apparent that this safety feature is important where high voltage circuits are involved.

The connecting operation is simply the reverse of the disconnecting operation, the door 2 being closed with the result that the linkage 19—20 coacting with the cam plate 15 moves the fuse unit 4 towards the right to cause engagement of the coacting disconnect contacts.

It should be understood that our invention is not limited to specific details of construction and arrangement thereof herein illustrated, and that changes and modifications may occur to one skilled in the art without departing from the spirit of our invention.

What we claim is new and desire to secure by Letters Patent of the United States:

1. Electric switchgear of the metal enclosed type comprising a metal housing having a hinged door, a carrier member mounted for reciprocal rectilinear movement within said housing towards and away from the door opening of said housing, electrical apparatus mounted on said carrier member on the side towards said door opening, movable disconnect contacts for said apparatus mounted on the opposite side of said carrier member for coacting with stationary disconnect contacts carried by said housing, and means interconnecting said door and carrier member for moving said electrical apparatus substantially into the door opening when said door is opened for disconnecting said apparatus, said carrier member also in said position precluding access to said stationary disconnect contacts.

2. Electric switchgear of the metal enclosed type comprising a metal housing having a hinged door, a fuse panel mounted within said housing for reciprocal movement between connected and disconnected positions, said panel being positioned substantially parallel to said door in the closed position thereof and having fuses mounted on the panel side adjacent said door, movable disconnect contacts for said fuses mounted on the opposite side of said panel for coacting with stationary disconnect contacts carried by said housing, and a linkage interconnecting said door and fuse panel for moving said panel to disconnected position towards the door opening when said door is opened for permitting unobstructed access to said fuses, said panel in said disconnected position substantially occupying said door opening so that access to said fuses is facilitated and access to said stationary disconnect contacts precluded.

3. Electric switchgear of the metal enclosed type comprising a metal housing having a hinged door, a fuse panel mounted for reciprocal movement within said housing between connected and disconnected positions, means including roller bearings at the opposite sides of said panel for supporting and guiding the same for reciprocal movement, said panel being positioned substantially parallel to said door in the closed position thereof and having fuses mounted on the panel side adjacent said door, movable disconnect contacts for said fuses extending from the rear side of said panel for coacting with stationary disconnect contacts carried by said housing, and means interconnecting said door and panel for causing reciprocal movement thereof in accordance with the movement of said door including a cam plate connected to said panel, said plate having an elongated slot, a roller operating in said slot and a linkage inter-connecting said roller and door, the relation between said linkage and slot being such that a comparatively large movement is imparted to said fuse panel upon initial opening of the door for moving said panel to its disconnected position.

KENNETH T. ASHDOWN.
VERNON L. COX.